US008165997B1

(12) United States Patent
Podgorny et al.

(10) Patent No.: US 8,165,997 B1
(45) Date of Patent: Apr. 24, 2012

(54) METHOD AND SYSTEM FOR CLASSIFYING POSTINGS IN A FORUM

(75) Inventors: Igor A. Podgorny, San Diego, CA (US);
Howard Chen, San Diego, CA (US);
Floyd J. Morgan, Carlsbad, CA (US);
Amit Rohatgi, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 364 days.

(21) Appl. No.: 12/510,195

(22) Filed: Jul. 27, 2009

(51) Int. Cl.
*G06F 17/30* (2006.01)

(52) U.S. Cl. ......... 707/688; 707/749; 707/750; 715/753

(58) Field of Classification Search ........... 707/736–750
See application file for complete search history.

(56) References Cited

U.S. PATENT DOCUMENTS

| | | | | |
|---|---|---|---|---|
| 2005/0198128 | A1* | 9/2005 | Anderson et al. | 709/204 |
| 2007/0150487 | A1* | 6/2007 | Christian et al. | 707/100 |
| 2007/0294281 | A1* | 12/2007 | Ward et al. | 707/102 |
| 2008/0215541 | A1* | 9/2008 | Li et al. | 707/3 |
| 2009/0106697 | A1* | 4/2009 | Ward et al. | 715/835 |
| 2009/0132689 | A1* | 5/2009 | Zaltzman et al. | 709/223 |
| 2010/0063797 | A1* | 3/2010 | Cong et al. | 704/9 |
| 2010/0162135 | A1* | 6/2010 | Wanas et al. | 715/753 |
| 2011/0035377 | A1* | 2/2011 | Wang et al. | 707/737 |
| 2011/0035381 | A1* | 2/2011 | Thompson et al. | 707/740 |

OTHER PUBLICATIONS

"Naive Bayes classifier", Wikipedia, Last Modified May 13, 2009, www.en.wikipedia.org/wiki/Naive_bayes (5 Pages).
"Weka—Machine Learning Software in Java", SourceForge.net, Copyright 1999-2009, weka.wiki.sourceforge.net/Primer (11 Pages).
WEKA the University of Waikato, "Weka 3: Data Mining Software in Java", Mar. 2007, www.cs.waikato.ac.nz/ml/weka/ (1 Page).

* cited by examiner

*Primary Examiner* — Hanh Thai
(74) *Attorney, Agent, or Firm* — Osha • Liang LLP

(57) ABSTRACT

A method for classifying a previously unclassified posting that includes extracting a plurality of terms from the previously unclassified posting on an application forum, calculating a term answer probability and a term comment probability for each term of the plurality of terms. The term answer probability defines a probability that the term is in an answer posting assigned to an answer class, and the term comment probability defines a probability that the term is in a comment posting assigned to a comment class. The method further includes performing a Bayesian analysis using the term answer probability and the term comment probability for each term of the plurality of terms to select a posting class for the previously unclassified posting. The posting class is either the answer class or the comment class. The posting class is assigned to the previously unclassified posting.

20 Claims, 6 Drawing Sheets

300 Example Table of Probabilities

| Term | Term Comment Probability | Term Answer Probability |
|---|---|---|
| and | 0.458 | 0.542 |
| as | 0.396 | 0.604 |
| file | 0.392 | 0.608 |
| have | 0.561 | 0.439 |
| i | 0.791 | 0.209 |
| issu | 0.529 | 0.471 |
| menu | 0.237 | 0.763 |
| option | 0.410 | 0.590 |
| problem | 0.836 | 0.164 |
| resolv | 0.613 | 0.387 |
| same | 0.688 | 0.312 |
| save | 0.386 | 0.614 |
| select | 0.133 | 0.867 |
| the | 0.464 | 0.536 |
| then | 0.286 | 0.714 |
| to | 0.457 | 0.543 |
| your | 0.194 | 0.806 |

Terms Column 302 | Term Comment Probabilities Column 304 | Term Answer Probabilities Column 306

*FIG. 5*

METHOD AND SYSTEM FOR CLASSIFYING POSTINGS IN A FORUM

CROSS-REFERENCE TO RELATED APPLICATIONS

Subject matter described herein may be related to subject matter described in U.S. patent application Ser. No. 12/112,516, entitled "Domain Based Interactive Search," in the names of Igor A. Podgorny, Amit Rohatgi, Floyd Morgan, and Paul Coletta, U.S. patent application Ser. No. 12/112,516, entitled "Method and System for Generating a Dynamic Help Document," in the names of Igor A. Podgorny, Amit Rohatgi, and Paul Coletta, and U.S. patent application Ser. No. 12/363,630, entitled "Context Based Interactive Search," in the names of Igor A. Podgorny, Amit Rohatgi, and Paul Coletta.

BACKGROUND

Finances can be complicated. Specifically, finances include managing various financial accounts (e.g., credit card accounts, checking accounts, savings accounts), managing different sources of income, having various financial obligations (e.g., obligations derived from healthcare and repayment of loans), planning for future events, preparing reports (e.g., tax return and other filings), etc. In efforts to simplify finances, users may use a financial application. Specifically, financial applications organize and simplify financial landscape of an individual or organization.

On occasion, a user of a financial application requires assistance to use the financial application. When a user requires assistance, the user may contact support personnel, such as by telephone, email, or chat, and/or may use documents, such as help files and tutorials, generated by the vendor of the financial application or professional tutors of the financial application. In addition to documents, the user may access a forum for the financial application. A forum is a virtual location that allows different users to communicate about a topic. Specifically, the forum provides a communication link between users. Thus, using the forum, users may share experiences with the financial application and assist each other.

In general, when a user wants to discuss a topic in the forum, the user creates a discussion thread by posting a question on the forum. Other users perusing the forum may provide a response to the question by posting comments or answers, in text, to the discussion thread. Thus, the user that posts the question is able to receive an answer to the user's exact question. Moreover, other users who have the same question may view the discussion thread and view all of the comments and answers provided by the community. As shown, the forum allows users to provide guidance to other users.

SUMMARY

In general, in one aspect, the invention relates to a method for classifying a previously unclassified posting, that includes extracting a plurality of terms from the previously unclassified posting on an application forum, calculating a term answer probability for each term of the plurality of terms, and calculating a term comment probability for each term of the plurality of terms. The term answer probability defines a probability that the term is in an answer posting assigned to an answer class, and the term comment probability defines a probability that the term is in a comment posting assigned to a comment class. The method further includes performing a Bayesian analysis using the term answer probability for each term of the plurality of terms and the term comment probability for each term of the plurality of terms to select a posting class for the previously unclassified posting. The posting class is either the answer class and the comment class. The posting class is assigned to the previously unclassified posting.

In general, in one aspect, the invention relates to a system for classifying a previously unclassified posting, that includes a computer processor, a data repository, and a classifier executing on the computer processor and connected to the data repository. The data repository includes functionality to store a term answer probability and a term comment probability for each term of the plurality of terms. The term answer probability defines a probability that the term is in an answer posting assigned to an answer class, and the term comment probability defines a probability that the term is in a comment posting assigned to a comment class. The classifier includes functionality to extract the plurality of terms from the previously unclassified posting on an application forum, obtain the term answer probability for each term of the plurality of terms, obtain the term comment probability for each term of the plurality of terms, and perform a Bayesian analysis using the term answer probability and the term comment probability for each term of the plurality of terms to select a posting class for the previously unclassified posting. The posting class is either the answer class and the comment class. The posting class is assigned to the previously unclassified posting.

In general, in one aspect, the invention relates to a computer readable medium that includes computer readable program code embodied therein for causing a computer system to extract a plurality of terms from the previously unclassified posting on an application forum, calculate a term answer probability for each term of the plurality of terms, and calculate a term comment probability for each term of the plurality of terms. The term answer probability defines a probability that the term is in an answer posting assigned to an answer class, and the term comment probability defines a probability that the term is in a comment posting assigned to a comment class. The computer readable program code further causes the computer system to perform a Bayesian analysis using the term answer probability for each term of the plurality of terms and the term comment probability for each term of the plurality of terms to select a posting class for the previously unclassified posting. The posting class is either the answer class or the comment class. The posting class is assigned to the previously unclassified posting.

Other aspects of the invention will be apparent from the following description and the appended claims.

BRIEF DESCRIPTION OF DRAWINGS

FIG. 5 shows an example in accordance with one or more embodiments of the invention.

DETAILED DESCRIPTION

Figure 1:
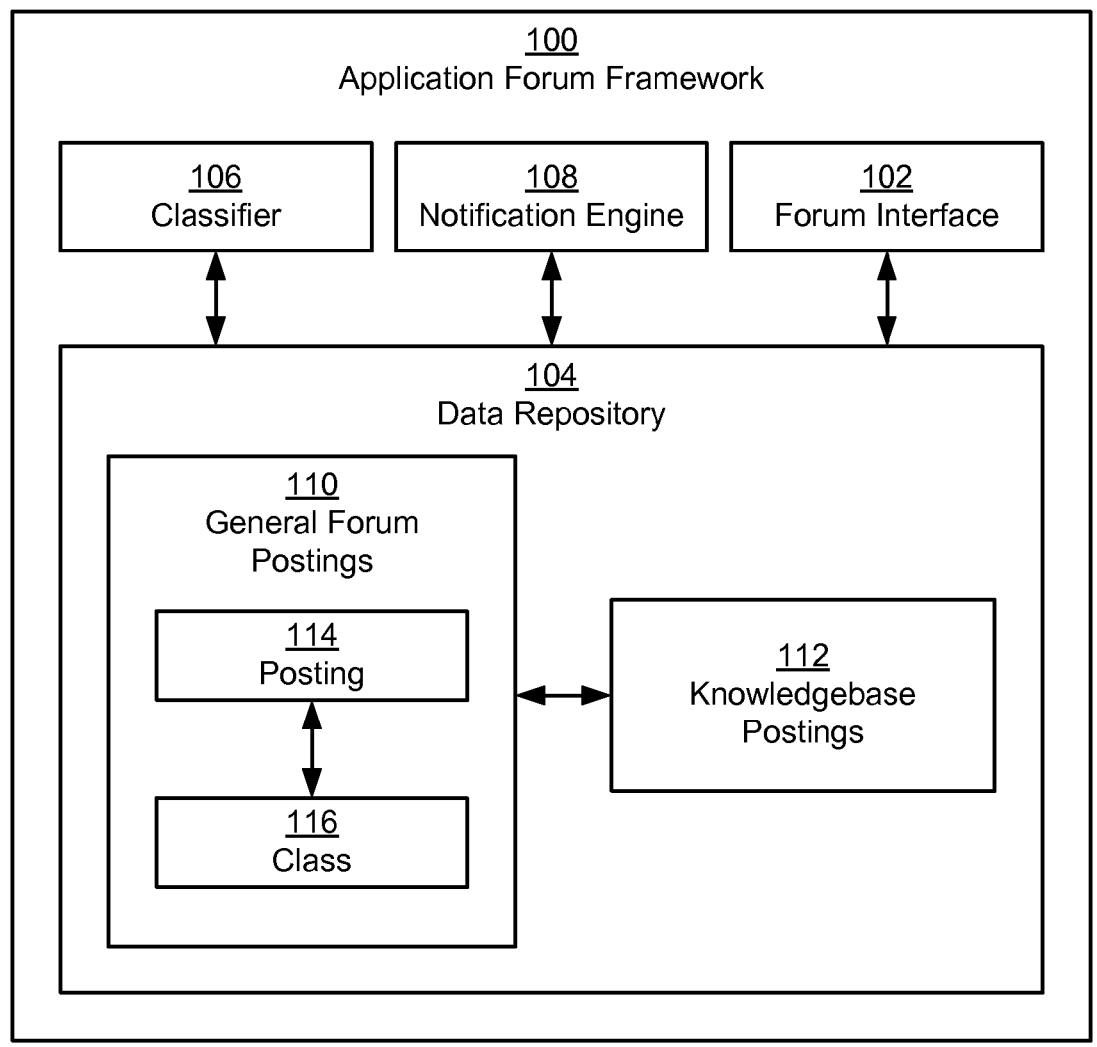
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for assigning a class to a previously unclassified posting in an application forum using Bayesian analysis. An application forum is a centralized virtual location for users of an application to communicate. Specifically, the application forum provides a location for users to discuss the application. In one or more embodiments of the invention, the application forum is available to the users via the Internet. Alternatively or additionally, the application forum may be available to the users via the application corresponding to the application forum.

In one or more embodiments of the invention, users submit postings to the application forum. A posting is a thought that the user wants to share with the community. For example, the posting may be a question (e.g., "How do I enter home office deductions into the tax application"), a comment (e.g., "I have the same question"), or an answer (e.g., "In order to submit home office deductions, select the form labeled . . . "). A posting class assigned to the posting describes the content within the posting (e.g., whether the posting is a comment, question, or answer). In one or more embodiments of the invention, the posting class assigned to the posting may be an answer class, a question class, or a comment class. The answer class indicates that the posting is an answer. The question class indicates that the posting is a question. The comment class indicates that the posting is a comment. In one or more embodiments of the invention, a posting class is the class assigned to the posting.

In one or more embodiments of the invention, the application corresponding to the posting is a financial application that maintains, classifies, and tracks financial data. The financial application may further include functionality to generate financial reports. For example, the financial application may assist users in filing a tax return, tracking transactions in financial accounts, and performing other such financial related operations.

FIG. 1 shows a schematic diagram of a system in accordance with one or more embodiments of the invention. As shown in FIG. 1, the system includes an application forum framework (100). The application forum framework (100) includes computer readable instructions and data for managing the application forum.

In one or more embodiments of the invention, the application forum framework (100) is executed on one or more computers. For example, the application forum framework may be executed on an application server and a storage server. Users may connect to the application forum framework via a client computing device (not shown). The client computing device may be a personal computer, a mobile computing device, or any other type of computing device that includes functionality to process instructions. In one or more embodiments of the invention, the client computing device may correspond to the same or to a different computing device used to access the application. Further, the application may execute locally or remotely on the client computing device.

In one or more embodiments of the invention, the application forum framework (100) includes a forum interface (102), a data repository (104), a classifier (106), and a notification engine (108). Each of these components is discussed in detail below.

In one or more embodiments of the invention, the forum interface (102) is a user interface (UI) and/or an application programming interface (API) for the application forum. Specifically, the forum interface (102) includes functionality to update the data repository and allow users and applications to access data in the data repository. Specifically, through the forum interface (102), a user may submit a posting to the application forum.

In one or more embodiments of the invention, the forum interface (102) is a graphical user interface (GUI). As a GUI, the forum interface (102) includes graphical user interface controls, such as buttons, drop down menu options, and other controls, for allowing users to submit and retrieve data from the application forum. For example, a user may access a website of the application forum using a web address defined for the application forum. Through the website, the user may search for discussion threads related to a topic of interest to the user in accordance with one or more embodiments of the invention. For example, the user may search for "tuition" to find out how to categorize tuition or claim tuition when filing income taxes. Through the website, the user may also create a new discussion thread and add postings to existing discussion threads in the application forum in accordance with one or more embodiments of the invention.

When the forum is an API, the forum interface (102) includes functionality to allow the application to obtain data from the data repository (104) to display in the interface of the application in accordance with one or more embodiments of the invention. Specifically, the forum interface (102) includes functionality to receive and process commands from the application. Similar to the website, through the application, the user may search discussion threads, create a new discussion thread, and submit postings to the forum in accordance with one or more embodiments of the invention. Thus, through the application, the user may communicate with the community of users in accordance with one or more embodiments of the invention.

The forum interface (102) is connected to the data repository (104). Specifically, the forum interface (102) includes functionality to retrieve and store data in the data repository (104). In one or more embodiments of the invention, the data repository (104) is any type of storage unit and/or device (e.g., a file system, database, collection of tables, or any other storage mechanism) for storing data. Further, the data repository (104) may include multiple different storage units and/or devices. The multiple different storage units and/or devices may or may not be of the same type or located at the same physical site.

In one or more embodiments of the invention, the data in the data repository (104) includes general forum postings (110) and knowledgebase postings (112). In one or more embodiments of the invention, the general forum postings (110) include current postings (114). Current postings (114) correspond to postings submitted by users to display in the application forum. Specifically, in one or more embodiments of the invention, postings are stored in the general forum postings (110) when posted by a user. The current postings (114) in the general forum postings (110) may include questions, comments, answers, and postings that are unclassified.

In one or more embodiments of the invention, the general forum postings (110) may be continually or periodically filtered according to the age of the posting and/or the relevance of the posting. For example, outdated postings (e.g., postings whose date is too long ago, related to a topic that had a recent change in the law or version of the application, etc.) may be removed from the general forum postings. Further, postings (114) in the general forum postings (110) may be filtered for other reasons, such as marked for removal by the users of the community in accordance with one or more embodiments of the invention.

In one or more embodiments of the invention, postings (114) in the general forum postings (110) may be associated with a class (116). As discussed above, the class (116) describes the content within posting (114). Specifically, the class defines whether the posting is a question, a comment, or an answer.

In one or more embodiments of the invention, some of the postings may be used as training postings. A training posting corresponds to a classified posting (i.e., a posting that is assigned to a class) that is used to train the classifier (106) (discussed below). In one or more embodiments of the invention, the training posting includes all classified postings in the general forum postings (110). In alternative embodiments of the invention, the training postings only include a subset of the postings in the general forum postings (110). The subset may include postings that were classified and/or verified by users. In one or more embodiments of the invention, rather than all users, only selected users are able to classify and/or verify the training postings. For example, the selected user may be selected based on professional training or experience, such as in finances or other topics of the application. As another example, the selected user may be an employee associated with the vendor of the application.

In one or more embodiments of the invention, the postings (114) in the general forum postings (110) are grouped into discussion thread(s). A discussion thread is a grouping of postings as defined by users. Specifically, an initial user may start a discussion thread with an initial posting. The initial posting may be a question, a comment, or an answer (e.g., about a new feature that the initial user discovered). Users may respond to the initial user and to each other in subsequent postings. In one or more embodiments of the invention, the data repository maintains an association between the discussion thread and the postings associated with the discussion thread.

In one or more embodiments of the invention, postings in the general forum postings (110) may be stored in the knowledgebase postings (112). In one or more embodiments of the invention, the knowledgebase postings (112) correspond to postings that are classified with the question class or the answer class. Specifically, knowledgebase postings (112) are postings that allow users to quickly see the answers that the user has to a question. In one or more embodiments of the invention, knowledgebase postings (112) include only postings that are highly ranked (e.g., by selected users) and are considered current. In one or more embodiments of the invention, knowledgebase postings (112) are stored according to the discussion threads. In one or more embodiments of the invention, the knowledgebase postings (112) exclude postings classified with the comment class.

In one or more embodiments of the invention, a classifier (106) is connected to the data repository (104). In one or more embodiments of the invention, the classifier (106) corresponds to a software program that includes functionality to assign a class to each posting (114). Further, in one or more embodiments of the invention, the classifier (106) corresponds to a Bayesian classifier. In one or more embodiments of the invention, a Bayesian classifier includes functionality to perform a Bayesian analysis on an unclassified posting based on information gathered in the training postings to assign a class to the posting.

In one or more embodiments of the invention, the notification engine (108) includes functionality to send a notification (e.g., by email, short message service (SMS) message, etc.) to a user that registers for a discussion thread. In one or more embodiments of the invention, the notification engine (108) only notifies users when new postings are classified with the answer class. Thus, the users are able to receive notifications that correspond to answers to their questions without receiving notifications of postings that provide only superfluous comments.

Figure 2:
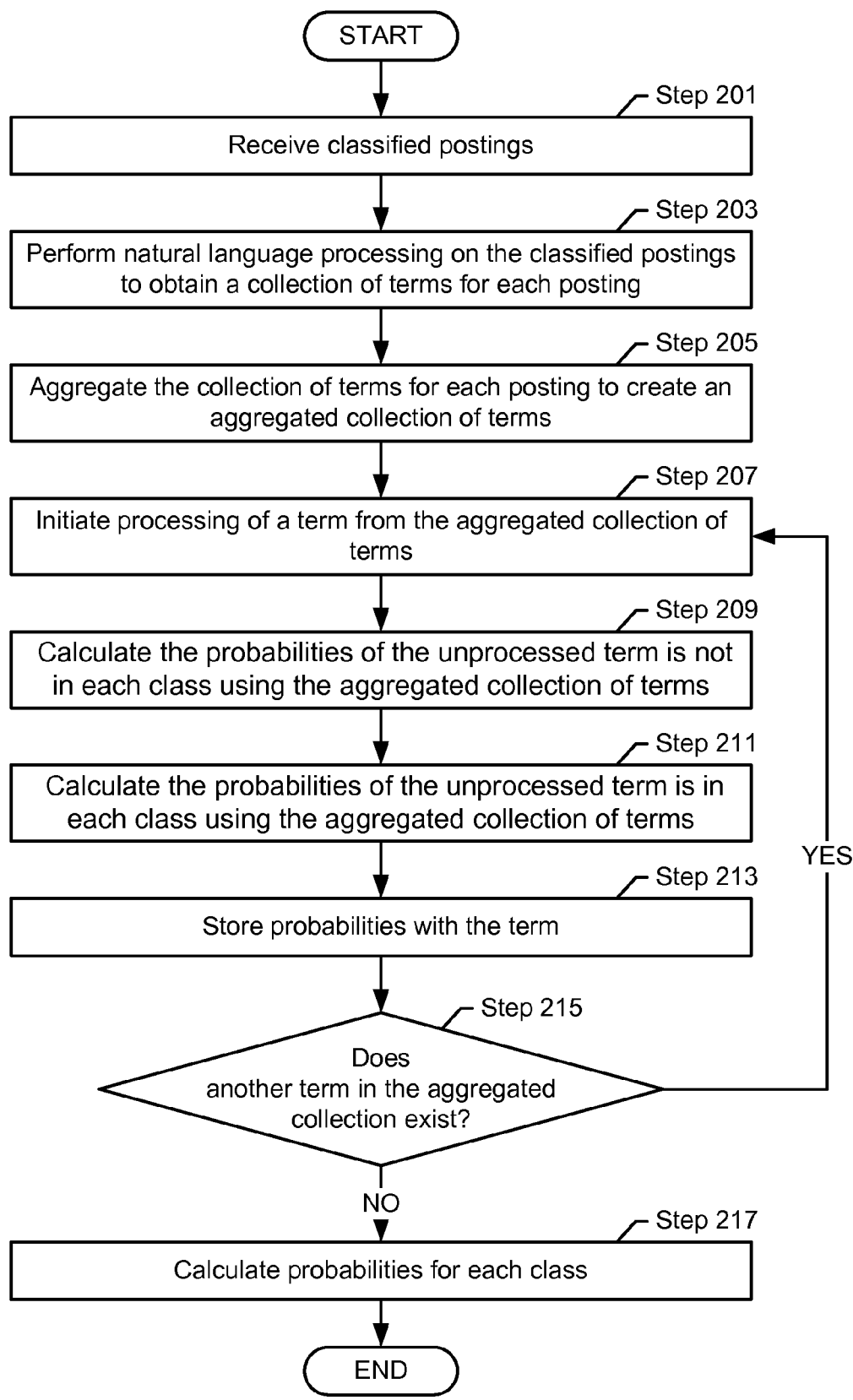
FIGS. 2-4 show flowcharts in accordance with one or more embodiments of the invention.
Figure 3:
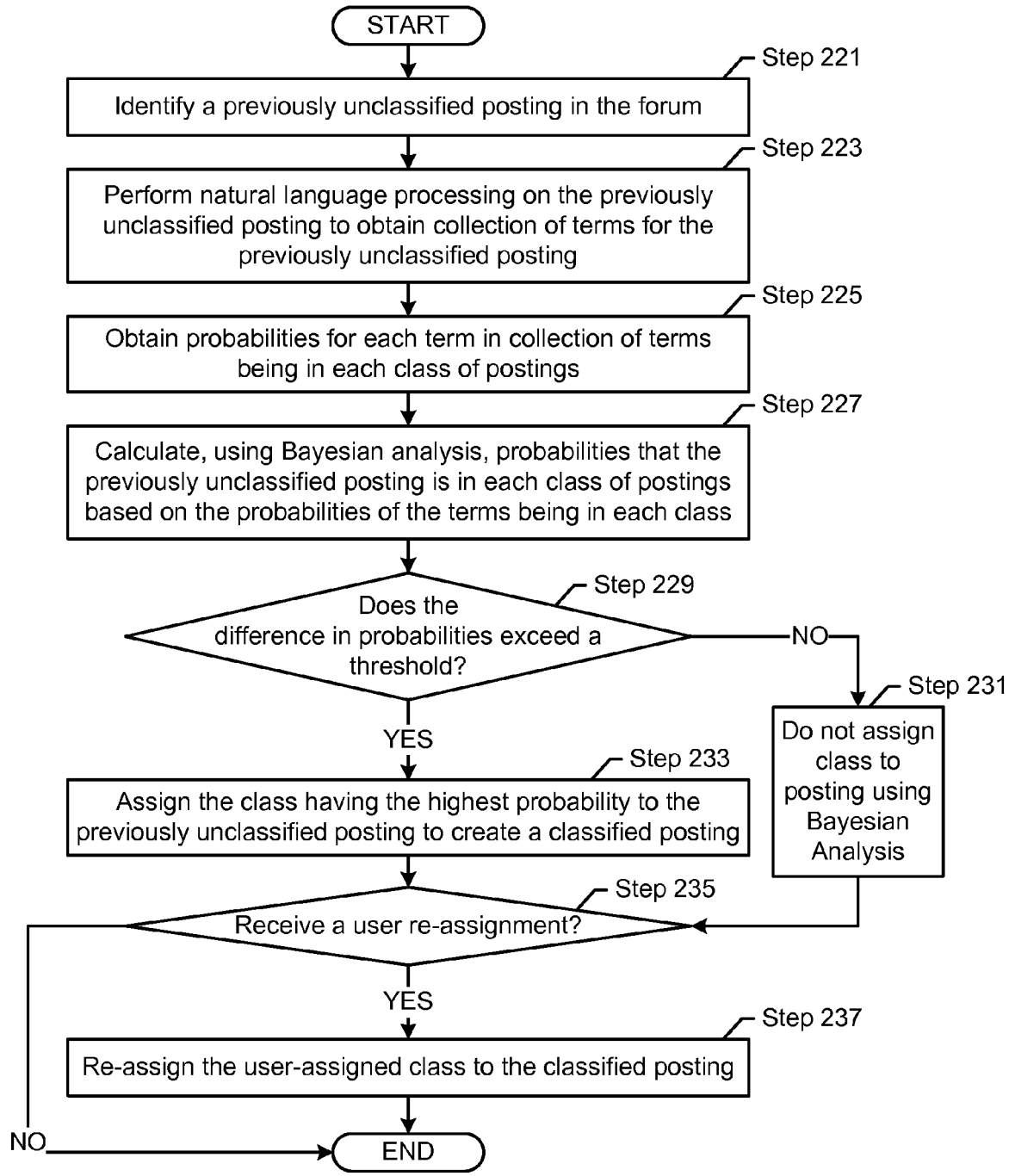
Figure 4:
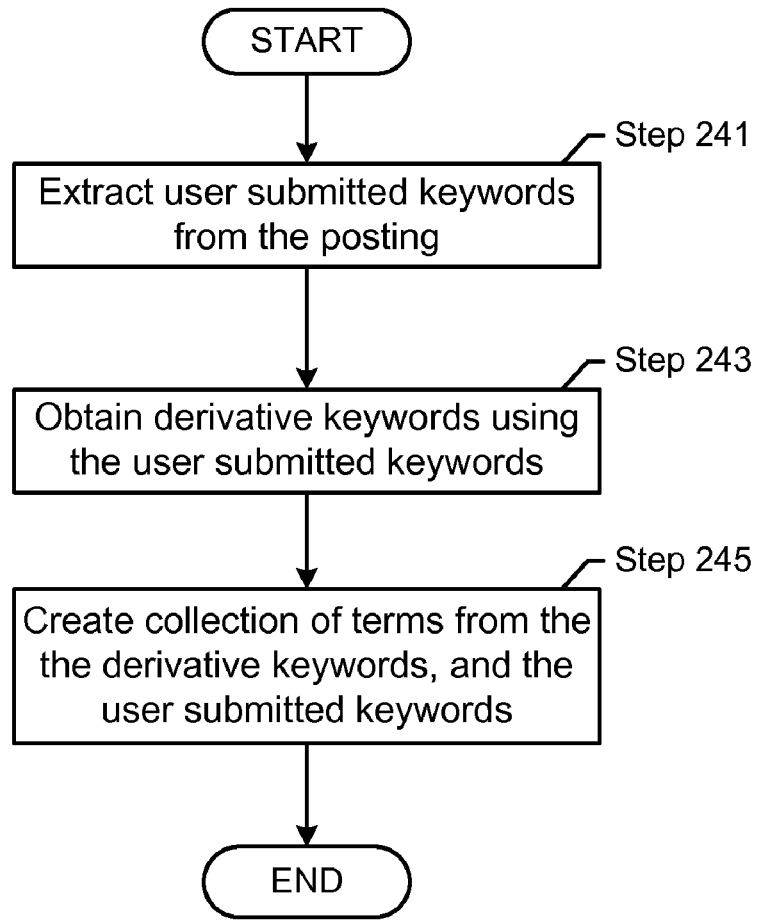

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 2 shows a flowchart for training the classifier in accordance with one or more embodiments of the invention. In one or more embodiments of the invention, the training of the classifier may be performed prior to classifying any posting using the classifier and periodically. For example, the classifier may be retrained every day, every week, etc.

In Step 201, classified postings are received. In one or more embodiments of the invention, the classified postings are postings stored in the general forum postings of the data repository that are already assigned to a class. In one or more embodiments of the invention, prior to any use of the classifier to classify postings, the classified posting are assigned to a class by users and/or administrators of the application forum. After an initial training and after the classifier is used to classify postings, the postings classified by the users and/or administrators as well as postings classified by the classifier are used as training postings to train the classifier in accordance with one or more embodiments of the invention. In one or more embodiments of the invention, only the postings classified and/or verified by the users and administrators are used to train the classifier. A posting is verified by the user and/or administrator when the classifier assigns a class to the posting, and the assignment by the classifier is validated by the user or administrator. As discussed above, the users that verify and classify postings may be all users or only selected users.

In alternative embodiments of the invention, even classified postings that are not verified or classified are used to train the classifier. For example, if the postings classified by the Bayesian classifier are mixed with postings classified by the administrator or user, then the postings classified by the Bayesian classifier may be used to train the Bayesian classifier. By way of an example, consider the scenario in which an inexperienced user replies to a question with a non-informative response and incorrectly classifies the posting as an answer. The Bayesian classifier may correct the classification and correctly classifies the posting as a comment. In such example, the posting classified by the Bayesian classifier may be used as a training posting. Using postings classified by the Bayesian classifier may be performed in the exceptional case rather than on a normal basis in the one or more alternative embodiments of the invention.

In Step 203, natural language processing is performed on the classified postings to obtain a collection of terms for each posting in accordance with one or more embodiments of the invention. The natural language processing is discussed below and in FIG. 4 in accordance with one or more embodiments of the invention. In one or more embodiments of the invention, the natural language processing is performed separately for each of the classified postings. Thus, a separate collection of terms may exist for each posting after the natural language processing is performed on all classified postings in accordance with one or more embodiments of the invention. For example, one collection of terms may indicate that Posting A has terms "I", "Roth IRA" "IRA", etc. and another collection of terms may indicate that Posting B has terms "I", "401K", "dependents", etc. In one or more embodiments of the invention, the natural language processing is performed by a specialized computer that is configured to obtain the collection of terms from the posting.

In Step 205, the collection of terms for each posting is aggregated to create an aggregated collection of terms. In one or more embodiments of the invention, the aggregating of the collection of terms is performed on a per class basis. Specifically, for each class and for each term, the number of postings having the term and assigned to the class is identified. The number is stored in the aggregated collection of terms. In one or more embodiments of the invention, the posting is considered to have the term when the term is in the posting's collection of terms. Thus, a posting may be considered to have the term when the term is a derivative term of the user-submitted keyword in the posting.

For example, for each term in the question class, the number of postings assigned to the question class that have the term is identified. In the aggregated collection of terms, the term is associated with a number for the question class. The aggregation may be similarly performed for the comment class and the answer class in accordance with one or more embodiments of the invention. Thus, in the aggregated collection of terms, each term is associated with a number indicating the number of postings having the term and assigned to the question class, a number indicating the number of postings having the term and assigned to the answer class, and a number indicating the number of postings having the term and assigned to the comment class. For example, the term, "think" may be associated with 2 for the question class, 40 for the answer class, and 23 for the comment class in the aggregated collection of terms.

In Step 207, processing of a term from the aggregated collection of terms is initiated in accordance with one or more embodiments of the invention. Specifically, an unprocessed term is selected from the aggregated collection of terms.

In Step 209, the probabilities that the unprocessed term is in each class are calculated using the aggregated collection of terms. In one or more embodiments of the invention, the probability is calculated for a term and class by calculating a total number of postings assigned to the class. Next, the number of postings having the term and assigned to the class is divided by the total number of postings assigned to the class to obtain a probability that a term is in the class. In one or more embodiments of the invention, the probability that the term is in a posting assigned to a class is referred to herein as the term class probability. For example, the term answer probability is the probability that the term is in an answer posting (i.e., a posting that is assigned to the answer class). As another example, the term comment probability is the probability that the term is in a comment posting (i.e., a posting that is assigned to the comment class). As another example, the term question probability is the probability that the term is in a question posting (i.e., a posting that is assigned to the question class). In one or more embodiments of the invention, calculating the probability in Step 209 is performed by a specialized computer that is configured to calculate probabilities.

In Step 211, the probabilities that the unprocessed term are not in each class is calculated using the aggregated collection of terms. In one or more embodiments of the invention, the probability is calculated for a term and class by calculating a total number of postings not assigned to the class. Next, the number of postings having the term and not assigned to the class is divided by the total number of postings not assigned to the class to obtain a probability that a term is not in the class. In Step 213, the probabilities calculated in Step 209 and in Step 211 are stored with the term in accordance with one or more embodiments of the invention. The probabilities may be used by the Bayesian classifier to classify additional postings. In one or more embodiments of the invention, calculating the probability in Step 211 is performed by the specialized computer that is configured to calculate probabilities.

In Step 215, a determination is made whether another term in the aggregated collection of terms exists. If another term in the collection of terms exists, then the method may repeat with Step 207 to process the next term.

In Step 217, the probabilities for each class are calculated. Specifically, the number of postings assigned to the class is divided by the total number of postings to calculate the probabilities for each class. The probability is stored as the probability for the class. In one or more embodiments of the invention, the calculating the probabilities is performed by the specialized computer configured to calculate probabilities.

Although not discussed above, the probabilities may be calculated above according to pairs of classes in accordance with one or more embodiments of the invention. For example, the pairs may correspond to {question class, answer class}, {question class, comment class}, and {comment class, answer class}. Thus, when calculating total probabilities, postings that are not assigned to either class in the pair of classes are disregarded.

For example, consider the scenario in which the term "think" is associated with 2 postings that are assigned to the question class, 40 postings that are assigned to the answer class, and 23 postings that are assigned to the comment class in the aggregated collection of terms. The following shows an example of how percentages may be calculated based on pairs of classes.

For the pair, {comment class, answer class}, the 2 postings assigned to the question class are disregarded. Thus, the term comment probability for the term, "think", is 23/(40+23) or 23/63 for the above pair. The probability that the term, "think" is not in the comment class is 40/63, which is also the term answer probability. The probability for the comment class is the total number of postings assigned to the comment class divided by the total number of postings assigned to either the answer class or the comment class. Conversely, the probability for the answer class is the total number of postings assigned to the answer class divided by the total number of postings assigned to either the answer class or the comment class.

For the pair, {question class, answer class}, the 23 postings assigned to the comment class are disregarded. Thus, the term question probability for the term, "think", is 2/(40+2) or 1/21 for the above pair. The probability that the term, "think", is not in the question class is 40/42 or 20/21, which is also the term answer probability. The probability for the question class is the total number of postings assigned to the question class divided by the total number of postings assigned to either the answer class or the question class. Conversely, the probability for the answer class is the total number of postings assigned to the answer class divided by the total number of postings assigned to either the answer class or the question class.

For the pair, {question class, comment class}, the 40 postings assigned to the answer class are disregarded. Thus, the term question probability for the term, "think", is 2/(23+2) or 2/25 for the above pair. The probability that the term, "think", is not in the question class is 23/25, which is also the term comment probability. The probability for the question class is the total number of postings assigned to the question class divided by the total number of postings assigned to either the comment class or the question class. Conversely, the probability for the comment class is the total number of postings assigned to the comment class divided by the total number of postings assigned to either the comment class or the question class.

In one or more embodiments of the invention, the probabilities are stored with the term and the pair used for comparison. For example, six probabilities may be stored for each term (i.e., two probabilities for each pair of classes). Further, each class may have three probabilities (i.e., one probability for each pair of classes).

In one or more embodiments of the invention, the pair approach is used to classify new postings using the Bayesian analysis. Specifically, in a first comparison, two classes are compared using the Bayesian analysis and the probabilities for the pair to identify a winner of the first comparison. In a second comparison, the winner of the first comparison is compared with the remaining class using the Bayesian analysis and the probabilities for the pair containing the winner and the remaining class to identify the class to assign to the posting.

Alternatively, a single comparison may be performed using all three classes. As another alternative, rather than determining whether the posting is in one of three classes, a determination may be made whether the posting is in one of two classes (e.g., the comment class or the answer class). In such scenario, the application forum may assume that the posting is not a question and use only the probabilities for the pair {comment class, answer class}.

FIG. 3 shows a flowchart for classifying an unclassified posting in accordance with one or more embodiments of the invention. In Step 221, a previously unclassified posting in the forum is identified. In one or more embodiments of the invention, a previously unclassified posting is a posting that is not yet assigned to a class.

In Step 223, natural language processing is performed on the previously unclassified posting to obtain a collection of terms for the previously unclassified posting. Performing the natural language processing is discussed below and in FIG. 4. In one or more embodiments of the invention, the natural language processing is performed by the specialized computer that is configured to perform natural language processing.

In Step 225, probabilities for each term in the collection of terms being in each class of postings (i.e., the term class probabilities) are identified. Specifically, the probabilities stored in FIG. 2 are obtained for each term. At this stage, as discussed above, if a pairwise comparison of postings is performed, then the probabilities are obtained only for the first pair of classes.

In Step 227, using Bayesian analysis, probabilities that the previously unclassified postings are in each class of postings are calculated based on the probabilities of the terms being in each class. In one or more embodiments of the invention, calculating the probabilities is performed using the equation:

$$\ln\left(\frac{p(C|P)}{p(\neg C|P)}\right) = \ln\left(\frac{p(C)}{p(\neg C)}\right) + \sum_{t_i}\left(\ln\left(\frac{p(t_i|C)}{p(t_i|\neg C)}\right)\right) \quad \text{Eq. 1}$$

In one or more embodiments of the invention, the above equation is used in the pair approach of the Bayesian analysis. Thus, for the discussion below, the probabilities discussed below use the probabilities calculated for the pair of classes being compared. For the purposes of the discussion below, the two classes in the pair are generically referred to as first class and second class. In the above equation, equation 1, "ln" means natural logarithm; "C" refers to the first class being compared; "P" refers to the unclassified posting; and "$t_i$" is the $i^{th}$ term in the collection of terms of the unclassified posting. Accordingly, "p(C|P)" is the probability that the posting is in the first class; "p(¬ C|P)" is the probability that the posting is not in the first class (i.e., the posting is in the second class); "p(C)" is the probability for the first class as calculated in Step 217 of FIG. 2; "p(¬ C)" is the probability for the second class in the pair as calculated in Step 217 of FIG. 2; "p($t_i$|C)" is the probability that the $i^{th}$ term is in the first class; "p($t_i$|¬ C)" is the probability that the $i^{th}$ term is not in the first class (i.e., the probability that the $i^{th}$ term is in the second class).

As shown above, the right hand side of the above equation may be calculated using values calculated in FIG. 2. In one or more embodiments of the invention, the posting is considered to be in the first class if:

$$\ln\left(\frac{p(C|P)}{p(\neg C|P)}\right) > 0 \quad \text{Eq. 2}$$

Otherwise, the posting may be considered to be in the second class. Further, in Step 229, a determination is made whether the difference in the probabilities exceed a threshold in accordance with one or more embodiments of the invention. Specifically, in one or more embodiments of the invention a determination may be made whether:

$$\left|\ln\left(\frac{p(C|P)}{p(\neg C|P)}\right)\right| > \text{Threshold} \quad \text{Eq. 3}$$

If the difference in probabilities does not exceed a threshold, in Step 229, then a determination is made not to assign a class to a posting using the Bayesian analysis in Step 231. Specifically, if the absolute value of the posting is not greater than a threshold, then a determination may be made that the Bayesian analysis cannot assign the class to the posting. In such a scenario, a default class may be assigned to the posting. As an alternative to or in addition to assigning a default class, the posting may be marked for users to assign a class to the posting. Alternatively, the posting may remain unclassified in the data repository without a marking. In one or more embodiments of the invention, the classification of postings, including performing the Bayesian analysis, is performed by the specialized computer that is configured to calculate probabilities and perform Bayesian analysis.

Continuing with FIG. 3, if a determination is made that the difference in probabilities exceeds a threshold, then one of the classes may be determined to be the winning class of the pair-wise comparison. Specifically, if the absolute value of the posting is greater than a threshold in Eq. 3, then embodiments of the invention may determine that the posting is more likely to be in the first class or the second class as specified by Eq. 2 (above). As discussed above, although not shown in FIG. 3, the Bayesian analysis discussed above and in Eq. 1, Eq. 2, and Eq. 3 may be calculated using the pair of the winning class and the remaining class in accordance with one or more embodiments of the invention. Accordingly, Steps 227, 229, and 231 may be repeated for the second comparison.

As an alternative to using equations 1, 2, and 3 (above), embodiments of the invention may determine which posting class to assign to the posting by performing the following. Calculate the probability that the posting is a comment by calculating the product of the term comment probabilities of the terms in the collection of terms. Calculate the probability that the posting is an answer by calculating the product of the term answer probabilities of the terms in the collection of terms. Calculate the probability that the posting is a question by calculating the product of the term question probabilities of the terms in the collection of terms. Next, embodiments of the invention may identify which of the probability that the posting is a comment, the probability that the posting is an answer, and the probability that the posting is a question is greatest. The class having the greatest probability is assigned to the posting.

In Step 233, the class having the highest probability is assigned to the previously unclassified posting to create a classified posting. The class assigned to the posting is a posting class in accordance with one or more embodiments of the invention. At this stage, the posting is assigned to the posting class in the data repository. Specifically, the posting is associated with an identifier of the posting class in the data repository. Assigning the posting to the class may be performed by a specialized computer that is configured to maintain the postings.

In Step 235, a determination is made whether a user re-assignment is received in accordance with one or more embodiments of the invention. In one or more embodiments of the invention, users viewing the forum may review postings. If the user determines that a classified posting is misclassified, then the user may submit a new class to the posting as a user re-assignment.

In Step 237, if a user re-assignment is received, then the user-assigned class is re-assigned to the classified posting in accordance with one or more embodiments of the invention. The user re-assignment allows for correcting misclassified postings and training the Bayesian classifier to better classify future postings.

In one or more embodiments of the invention, when an unclassified posting is classified as an answer, a notification engine may be triggered to search for users who are registered to receive notifications of postings in a discussion thread. The registered users may be sent a notification (e.g., through short messaging service, email, etc.) that a new answer posting is available. In one or more embodiments of the invention, the notification engine only notifies users of postings that are newly assigned to the answer class. By only notifying users of postings that are assigned to the answer class, then embodiments of the invention provide a filter whereby users do not need to search through many reply postings to find an answer to their question. Alternatively, users may register for classes to which the user would like to receive notifications of new postings in the discussion thread.

Further, in one or more embodiments of the invention, postings assigned to the comment class may be deleted or hidden after a specified amount of time. Thus, only postings that correspond to question and answers may remain after the specified amount of time, thereby creating a knowledgebase for users of the application forum.

FIG. 4 shows a flowchart for performing natural language processing in accordance with one or more embodiments of the invention. In Step 241, user-submitted keywords are extracted from the posting in accordance with one or more embodiments of the invention. Different techniques may be used to extract the user-submitted keywords from the posting, such as empirical analysis, analyzing the keywords, performing natural language processing, parsing and extracting the keywords, or performing other operations.

For example, extracting the user-submitted keywords may include parsing the posting to identify terms in the posting. For example, separation identifiers, such as white space, commas, semi-colons, and other such characters may be indicative of a separation of terms in the posting. Accordingly, the term prior to the separation identifier is separated from the term after the separation identifier. Further, multiple terms in the posting may be grouped into a single keyword. For example, if the posting includes the terms "Roth IRA", then "Roth IRA" may be extracted as a single keyword.

Some terms having multiple instances may have multiple instances listed in the collection of terms due to the significance of the position of each instance in the sentence for classification. For example, the terms "can" and "do" at the beginning of a sentence may indicate a higher probability of the sentence being a question rather than an answer and, therefore, may be processed separately from "can" and "do" in the middle or at the end of the sentence. In such a scenario, each instance may be associated with a position identifier. In the example, "can" and "do" may be associated with "can-begin" and "do-begin" and/or "can-not_begin" and "do-not_begin" to indicate the position.

When extracting user-submitted keywords from a posting, certain terms in the posting may be omitted. For example, terms that have an equal probability of being in each class may be omitted. In such an example, prepositions, definite articles, and conjunctions may be omitted. As another example, certain pronouns may not be omitted because the pronoun may have a higher probability of being in either a question, comment, or answer. Further, in one or more embodiments of the invention, terms may be omitted based on the frequency of the terms in the training postings. For example, terms that only have a few instances in the training postings (i.e., only appear once or a few times) may be omitted while terms that have many instances are kept. Determining which terms to omit may be based, for example, on an omission list that includes all of the keywords to omit. In one embodiment of the invention, the omission list is maintained on a per product context basis.

In Step 343, derivative terms are obtained using the user-submitted keywords in accordance with one or more embodiments of the invention. A derivative term is a terms derived from the user-submitted keywords. For example, the derivative term may correspond to a synonym, a variation in spelling, a concatenation of multiple keywords, a change in tense, a root term, an abbreviation, a correct term for a common misnomer, a correct term for a commonly misunderstood term, a completion of an incomplete term, a portion of a term, or otherwise related to one or more of the user-submitted keywords. For example, if a user-submitted keyword is "Pay", "Paid", "Paying", or any other form of the verb, "to Pay", the derivative term related to each of the user-submitted keywords may be "Pai".

In one or more embodiments of the invention, each keyword is compared with the keyword data repository to identify the derivative terms. The keyword data repository may include multiple tools, such as a thesaurus, a spelling dictionary, a conversion index (e.g., to convert between different tenses), and other such tools.

In Step 245, a collection of terms is obtained from the derivative terms and the user-submitted keywords in accordance with one or more embodiments of the invention. In one or more embodiments of the invention, in the collection of terms, each derivative term replaces the user-submitted keyword(s) from which the derivative terms were derived.

The following example is for explanatory purposes only and not intended to limit the scope of the invention. FIG. 5 shows an example in accordance with one or more embodiments of the invention. Specifically, FIG. 5 shows an example table of example probabilities (300) that are obtained after training the classifier. The probabilities listed in the example table (300) are for example purposes only and not intended to limit the scope of the invention nor to indicate that these are actual calculated probabilities from existing postings.

The example table (300) shows a terms column (302) of terms extracted from training postings during training for the example. The term comment probability (304) shows the probability that the corresponding term (i.e., the term in the same row) is in a comment posting. The term answer probability (306) shows the probability that the corresponding term is in an answer posting. For the purposes of the example, consider the scenario that the probability of the answer class is the same as the probability of the comment class. In other words, both probabilities are ½ or 0.500.

For the following example, consider the scenario in which a user, Jack, wants to create a new document from an already existing document in an application. In the example, Jack accesses the application forum for the application. After searching for an answer to his question, Jack decides that because other users have not yet asked the same question, he should start a discussion thread. Accordingly, Jack starts a new discussion thread with the posting, "How do I create a new document from an existing document when I have the existing document open?" Further, because Jack would like to have a quick answer to his question, Jack registers to receive notifications of new postings. Specifically, Jack wants to know when another user of the application replies with an answer.

Continuing with the example, over time, various users have the same question. In order to provide the moral support, the users post a reply to Jack's posting with "I'm in the same boat" or "Let me know when you find out what the answer is" and other such comments. Each of the comments is correctly classified as a comment. For example, in response to Jack's question, Sue, another user, posts, "I have the same issue." When the application forum receives Sue's posting, the application forum classifies the posting.

First, in the example, the application forum performs natural language processing on the posting to obtain a collection of terms. The natural language processing parses Sue's posting to obtain the user-submitted keywords, "I", "have", "the", "same", and "issue". Next, the natural language processing queries a data repository to obtain the derivative keywords from the user submitted keywords. Specifically, when querying the data repository with "issue", the application forum retrieves the derivative keyword "issu". Further, "I" is changed to "i". Accordingly, in the example, the collection of terms include "have", "i", "issu", "same", and "the".

Next, the classifier of the application forum uses the example probabilities shown in FIG. 5 using equation 1 (above) to obtain:

$$\ln\left(\frac{.5}{.5}\right) + \ln\left(\frac{0.561}{0.439}\right) + \ln\left(\frac{0.791}{0.209}\right) +$$
$$\ln\left(\frac{0.529}{0.471}\right) + \ln\left(\frac{0.688}{0.312}\right) + \ln\left(\frac{0.464}{0.536}\right) = 2.338$$

In the above equation, the probability that each term is in a comment posting is in each of the numerators, the probability that the term is not in a comment posting (i.e., an answer) is in the denominator. Because 2.338 is greater than zero, the classifier assigns comment class to the posting "I have the same issue". Accordingly, Jack does not receive a notification of Sue's posting. Because Jack does not receive notification of Sue's posting, Jack is not interrupted during his daily activities just to determine that other user's have the same problem. Moreover, because many users of the application forum reply to Jack's posting with comments, which are classified as comments, Jack does not need to parse through all of the user's postings.

Next, after reading Jack's message, Howard submits a posting to the forum. Specifically, Howard posts the message, "To resolve your problem, select the file menu option and then select save as". The application forum classifies the posting. Specifically, the application forum performs natural language processing on the posting to obtain a collection of terms. The natural language processing parses Howard's posting to obtain the user-submitted keywords, "To", "resolve", "your", "problem", "select", "the", "file", "menu", "option", "and", "then", "select", "save", and "as". The repeat keywords (i.e., select) are removed and the data repository is queried to obtain the derivative keywords from the user submitted keywords. Accordingly, in the example, the collection of terms include "and", "as", "file", "menu", "option", "problem", "resolv", "save", "select", "the", "then", "to", and "your".

Next, the classifier uses the example probabilities shown in FIG. 5 using equation 1 (above) to obtain:

$$\ln\left(\frac{.5}{.5}\right) + \ln\left(\frac{0.485}{0.542}\right) + \ln\left(\frac{0.396}{0.604}\right) + \ln\left(\frac{0.392}{0.608}\right) + \ln\left(\frac{0.237}{0.763}\right) +$$
$$\ln\left(\frac{0.410}{0.590}\right) + \ln\left(\frac{0.836}{0.164}\right) + \ln\left(\frac{0.613}{0.387}\right) + \ln\left(\frac{0.386}{0.614}\right) + \ln\left(\frac{0.133}{0.867}\right) +$$
$$\ln\left(\frac{0.464}{0.536}\right) + \ln\left(\frac{0.286}{0.714}\right) + \ln\left(\frac{0.457}{0.543}\right) + \ln\left(\frac{0.194}{0.806}\right) = -5.468$$

In the above equation, the probability that each term is in a comment posting is in each of the numerators. The probability that the term is not in a comment posting (i.e., an answer) is in the denominator. Because −5.468 is less than zero, the posting "To resolve your problem, select the file menu option and then select save as" is assigned the answer class. Because a new posting is assigned the answer class, the notification engine identifies the registered users for the discussion thread and sends to the registered users a notification that the new posting exists or the new posting. Accordingly, Jack receives notification of Howard's posting. Jack resolves his problem based on the posting and is able to continue using the application.

Later, the application forum is performing a clean-up operation to remove outdated postings and conserve storage space. The application forum identifies all postings assigned the comment class and deletes the postings. The remaining postings are stored in a frequently asked question (FAQ) in the question answer pairs for users who have the same problem to peruse. Thus, when several months pass since Howard's posting, and Jane visits the application forum with the same question as Jack, Jane can view the FAQ to quickly obtain the answer to her question. Specifically, because all of the comment postings are removed, Jane does not need to parse through several unhelpful postings to obtain her answer.

Figure 6:
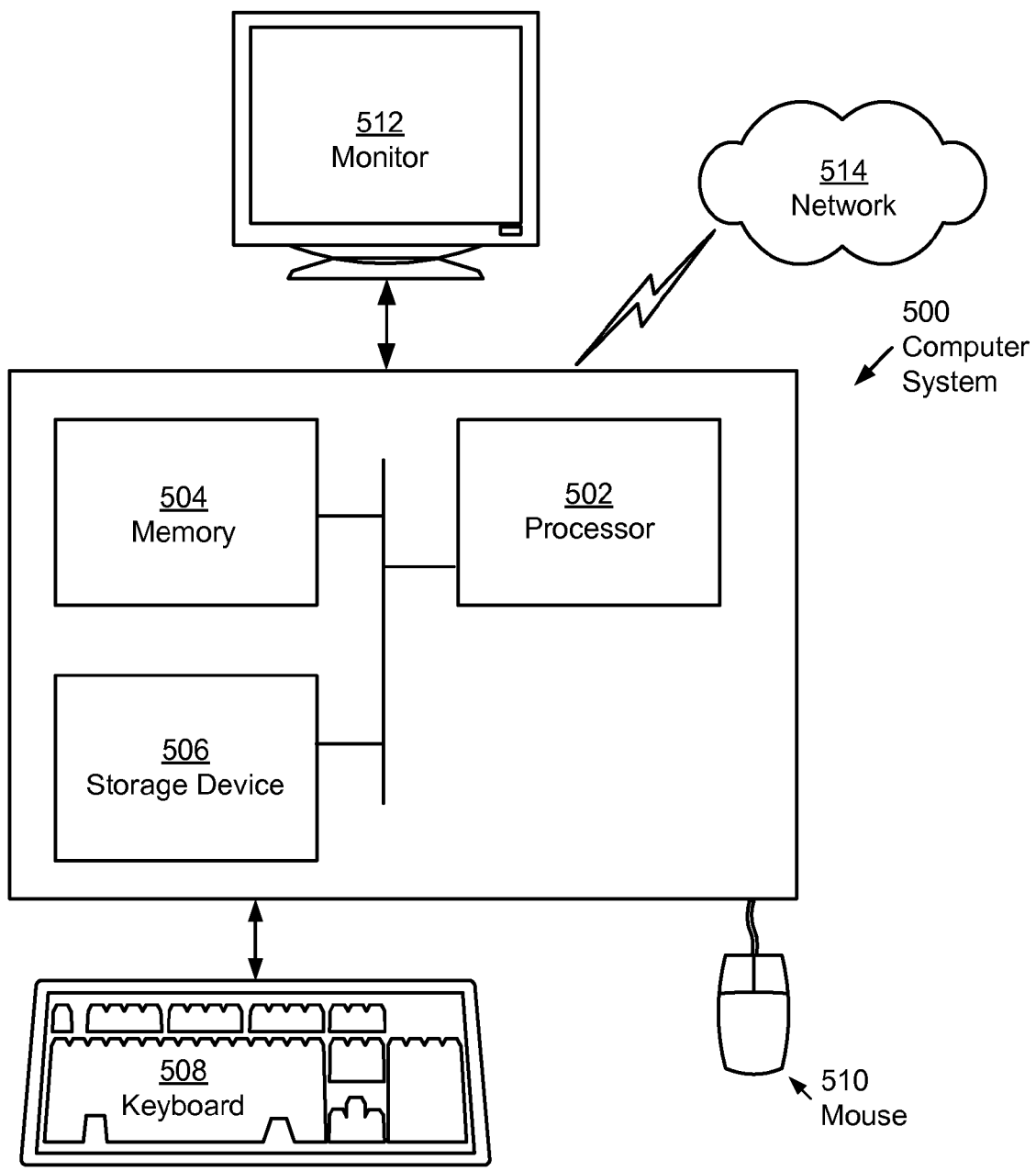
FIG. 6 shows a computer system in accordance with one or more embodiments of the invention.

Embodiments of the invention may be implemented on virtually any type of computer regardless of the platform being used. For example, as shown in FIG. 6, a computer system (500) includes one or more computer processor(s) (502) (i.e., a central processing unit or units), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying a previously unclassified posting, comprising:
    extracting a plurality of terms from the previously unclassified posting on an application forum;
    calculating, by at least one computer processor, a term answer probability for each term of the plurality of terms, wherein the term answer probability defines a probability that the term is in an answer posting assigned to an answer class;
    calculating, by at least one computer processor, a term comment probability for each term of the plurality of terms, wherein the term comment probability defines a probability that the term is in a comment posting assigned to a comment class;
    performing a Bayesian analysis using the term answer probability for each term of the plurality of terms and the term comment probability for each term of the plurality of terms to select a posting class for the previously unclassified posting, wherein the posting class is one of the answer class and the comment class; and
    assigning, by the at least one computer processor, the posting class to the previously unclassified posting.

2. The method of claim 1, wherein extracting the plurality of terms comprises:
    parsing the previously unclassified posting to identify a first user-submitted keyword; and
    querying a data repository with the first user-submitted keyword to identify a derivative term,
    wherein the plurality of terms comprises the derivative term.

3. The method of claim 2, wherein parsing the previously unclassified posting further identifies a second user-submitted keyword, and wherein the plurality of terms comprises the second user-submitted keyword.

4. The method of claim 1, further comprising:
    calculating a term question probability for each term of the plurality of terms, wherein the term question probability defines a probability that the term is in a question posting assigned to a question class,
    performing the Bayesian analysis using the term question probability for each term of the plurality of terms to determine whether to assign the posting class and the question class to the previously unclassified posting; and
    assigning the question class to the previously unclassified posting when indicated by the Bayesian analysis using the term question probability for each term of the plurality of terms.

5. The method of claim 1, further comprising:
    detecting that the previously unclassified posting is assigned to the answer class; and
    sending a notification of the previously unclassified posting to at least one registered user of a discussion thread comprising the previously unclassified posting based on the previously unclassified posting being assigned to the answer class, wherein the notification is not sent when the previously unclassified posting is assigned to the comment class.

6. The method of claim 1, further comprising:
    saving a plurality of classified postings assigned to the answer class and the question class to a frequently asked question store based on the plurality of classified postings being assigned to the answer class and the question class; and
    deleting at least one posting assigned to the comment class based on the at least one posting being assigned to the comment class.

7. The method of claim 1, further comprising:
    receiving a plurality of classified postings; and
    training a classifier to perform the Bayesian analysis using the plurality of classified postings,
    wherein the calculating the term answer probability for each term of the plurality of terms and the calculating the term comment probability for each term of the plurality of terms is performed during the training using the plurality of classified postings.

8. A system for classifying a previously unclassified posting, comprising:
    a computer processor;
    a data repository configured to:

store a term answer probability for each term of a plurality of terms, wherein the term answer probability defines a probability that the term is in an answer posting assigned to an answer class; and store a term comment probability for each term of the plurality of terms, wherein the term comment probability defines a probability that the term is in a comment posting assigned to a comment class; and a classifier executing on the computer processor, connected to the data repository, and configured to:

extract the plurality of terms from the previously unclassified posting on an application forum;

obtain the term answer probability for each term of the plurality of terms;

obtain the term comment probability for each term of the plurality of terms;

perform a Bayesian analysis using the term answer probability for each term of the plurality of terms and the term comment probability for each term of the plurality of terms to select a posting class for the previously unclassified posting, wherein the posting class is one of the answer class and the comment class; and assign the posting class to the previously unclassified posting.

9. The system of claim 8, wherein extracting the plurality of terms comprises:

parsing the previously unclassified posting to identify a first user-submitted keyword; and querying the data repository with the first user-submitted keyword to identify a derivative term, wherein the plurality of terms comprises the derivative term.

10. The system of claim 9, wherein parsing the previously unclassified posting further identifies a second user-submitted keyword, and wherein the plurality of terms comprises the second user-submitted keyword.

11. The system of claim 8, wherein the classifier is further configured to:

obtain, from the data repository, a term question probability for each term of the plurality of terms, wherein the term question probability defines a probability that the term is in a question posting assigned to a question class, perform the Bayesian analysis using the term question probability for each term of the plurality of terms to determine whether to assign the posting class and the question class to the previously unclassified posting; and assign the question class to the previously unclassified posting when indicated by the Bayesian analysis using the term question probability for each term of the plurality of terms.

12. The system of claim 8, further comprising a notification engine configured to:

detect that the previously unclassified posting is assigned to the answer class; and send a notification of the previously unclassified posting to at least one registered user of a discussion thread comprising the previously unclassified posting based on the previously unclassified posting being assigned to the answer class, wherein the notification is not sent when the previously unclassified posting is assigned to the comment class.

13. The system of claim 8, further comprising an application forum framework configured to:

save a plurality of classified postings assigned to the answer class and the question class to a frequently asked question store based on the plurality of classified postings being assigned to the answer class and the question class; and delete at least one posting assigned to the comment class based on the at least one posting being assigned to the comment class.

14. The system of claim 8, wherein the classifier is further configured to:

receive a plurality of classified postings; and train a classifier to perform the Bayesian analysis using the plurality of classified postings, wherein training the classifier comprises:

calculating the term answer probability for each term of the plurality of terms; and calculating the term comment probability for each term of the plurality of terms.

15. A computer readable medium comprising computer readable program code embodied therein for causing a computer system to:

extract a plurality of terms from a previously unclassified posting on an application forum;

calculate a term answer probability for each term of the plurality of terms, wherein the term answer probability defines a probability that the term is in an answer posting assigned to an answer class;

calculate a term comment probability for each term of the plurality of terms, wherein the term comment probability defines a probability that the term is in a comment posting assigned to a comment class;

perform a Bayesian analysis using the term answer probability for each term of the plurality of terms and the term comment probability for each term of the plurality of terms to select a posting class for the previously unclassified posting, wherein the posting class is one of the answer class and the comment class; and assign the posting class to the previously unclassified posting.

16. The computer readable medium of claim 15, wherein extracting the plurality of terms comprises:

parsing the previously unclassified posting to identify a first user-submitted keyword; and querying a data repository with the first user-submitted keyword to identify a derivative term, wherein the plurality of terms comprises the derivative term.

17. The computer readable medium of claim 16, wherein parsing the previously unclassified posting further identifies a second user-submitted keyword, and wherein the plurality of terms comprises the second user-submitted keyword.

18. The computer readable medium of claim 15, wherein the computer readable program code further causes the computer system to:

calculate a term question probability for each term of the plurality of terms, wherein the term question probability defines a probability that the term is in a question posting assigned to a question class, perform the Bayesian analysis using the term question probability for each term of the plurality of terms to determine whether to assign the posting class and the question class to the previously unclassified posting; and assign the question class to the previously unclassified posting when indicated by the Bayesian analysis using the term question probability for each term of the plurality of terms.

19. The computer readable medium of claim 15, wherein the computer readable program code further causes the computer system to:

detect that the previously unclassified posting is assigned to the answer class; and send a notification of the previously unclassified posting to at least one registered user of a discussion thread comprising the previously unclassified posting based on the previously unclassified posting being assigned to the answer class, wherein the notification is not sent when the previously unclassified posting is assigned to the comment class.

20. The computer readable medium of claim 15, wherein the computer readable program code further causes the computer system to:

save a plurality of classified postings assigned to the answer class and the question class to a frequently asked question store based on the plurality of classified postings being assigned to the answer class and the question class; and delete at least one posting assigned to the comment class based on the at least one posting being assigned to the comment class.

* * * * *